United States Patent [19]

DeWald et al.

[11] Patent Number: 4,598,895
[45] Date of Patent: Jul. 8, 1986

[54] PLUG VALVE WITH HYDRAULICALLY ACTUATED SEALS

[75] Inventors: Carl O. DeWald, Thousand Oaks; Jack H. Pollock, Gardena, both of Calif.

[73] Assignee: Precision Technologies, San Francisco, Calif.

[21] Appl. No.: 646,099

[22] Filed: Aug. 31, 1984

[51] Int. Cl.[4] ............................................. F16K 31/44
[52] U.S. Cl. ..................................... 251/78; 251/159; 251/172; 60/592; 138/31
[58] Field of Search ................ 251/78, 159, 172, 173; 138/31; 60/592, 594, 413, 416

[56] References Cited

U.S. PATENT DOCUMENTS

| | | | |
|---|---|---|---|
| 1,056,529 | 3/1913 | Fox | 138/31 |
| 2,611,393 | 9/1952 | Gravenhorst | 138/31 |
| 3,037,524 | 6/1962 | Rast | 137/556 X |
| 3,077,898 | 2/1963 | Raymond | 138/31 X |
| 3,096,786 | 7/1963 | Rost | 251/172 X |
| 3,182,458 | 5/1965 | Smith | 138/31 X |
| 3,213,615 | 10/1965 | Björnberg | 138/31 X |
| 3,464,669 | 9/1969 | Henrion | 251/173 |
| 3,901,474 | 8/1975 | Kubota | 251/159 |
| 4,130,129 | 12/1978 | Pollock | 251/175 X |
| 4,141,536 | 2/1979 | Graham | 251/161 |
| 4,497,467 | 2/1985 | DeWald | 251/175 X |

FOREIGN PATENT DOCUMENTS

| | | | |
|---|---|---|---|
| 2609316 | 10/1976 | Fed. Rep. of Germany | 251/172 |
| 1181228 | 2/1970 | United Kingdom | 251/172 |

*Primary Examiner*—Harold W. Weakley
*Attorney, Agent, or Firm*—Christie, Parker & Hale

[57] ABSTRACT

A valve having a body with an inlet duct, an outlet duct and a plug rotatably disposed in the body. The plug has a port to provide for fluid communication between the inlet and outlet ducts and is movable between an open position wherein the port at least partially registers with both the inlet and outlet ducts to pass fluid through the valve to a closed position wherein no part of the port registers with the ducts, thereby preventing fluid from passing through the valve. The valve has a pressurizable seal between the body and plug, when the plug is at both the open and closed positions. To actuate the seal, a closed hydraulic system is provided. A regulator piston is urged against the pressure of the hydraulic system with a preselected force to regulate the hydraulic pressure. The valve also includes a mechanism to compensate for hydraulic fluid thermal expansion.

3 Claims, 9 Drawing Figures

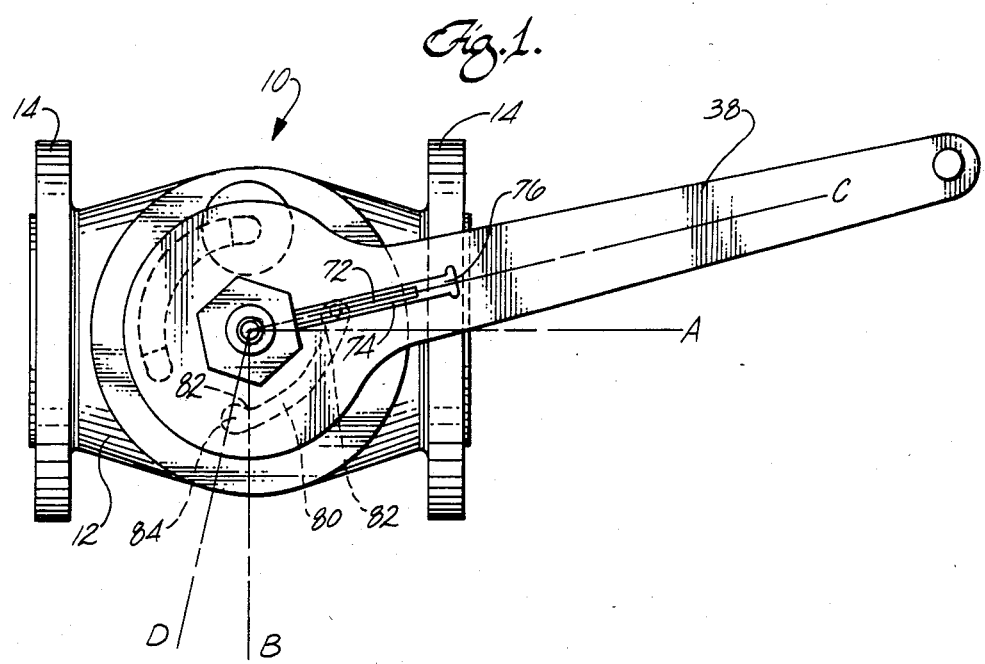
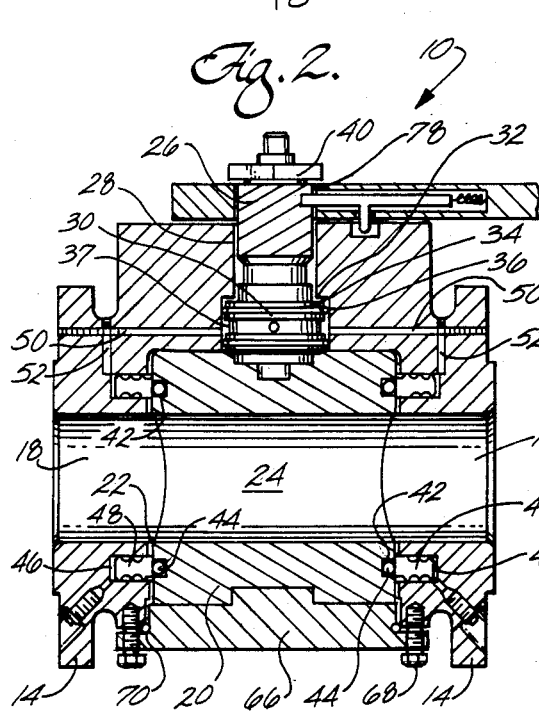
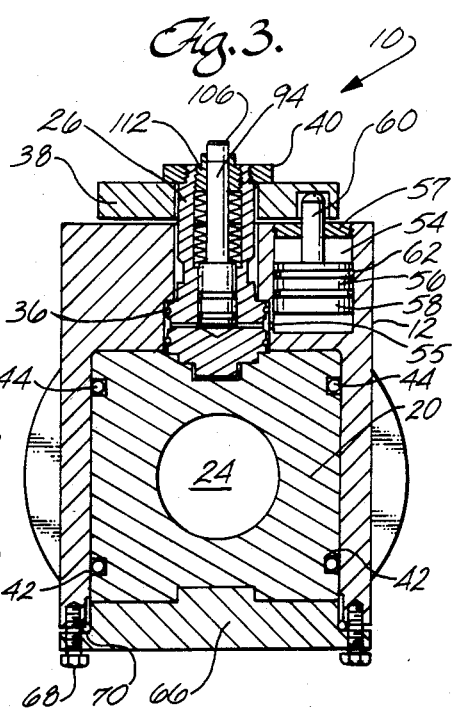

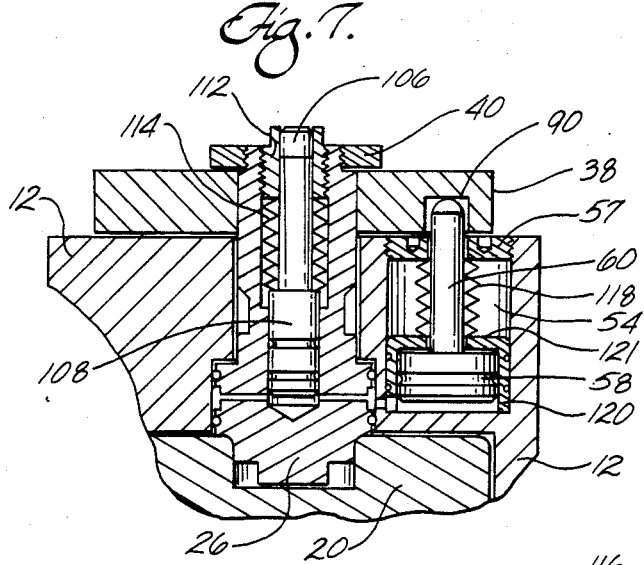
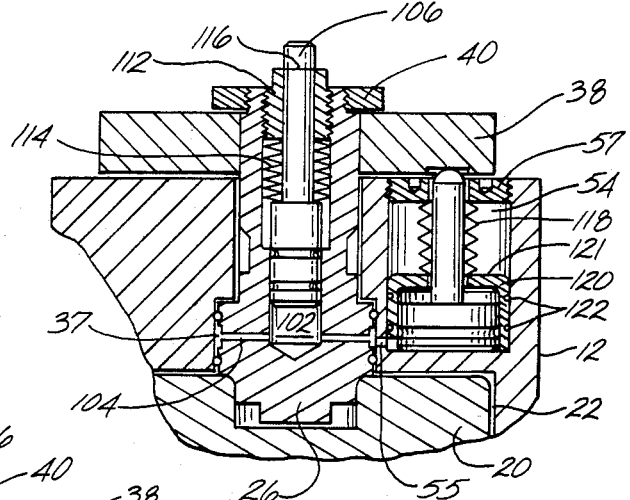
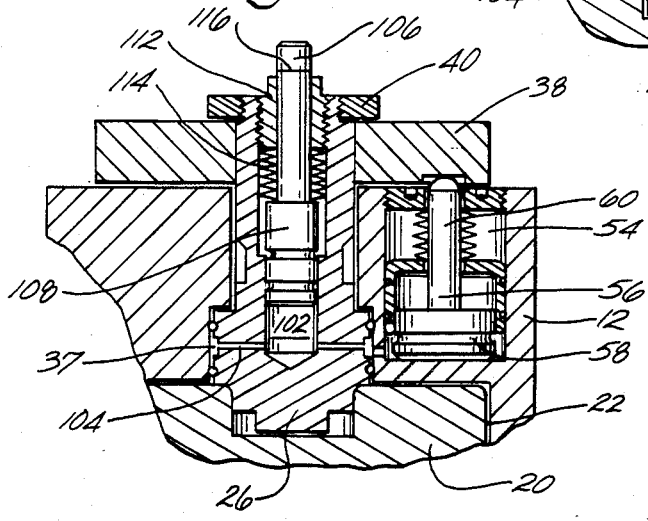

PLUG VALVE WITH HYDRAULICALLY ACTUATED SEALS

FIELD OF THE INVENTION

This invention relates to valves for controlling the flow of fluid through a line. More particularly, it relates to valves of the plug type having hydraulically actuated seals between the valve's rotatable plug and the valve body.

BACKGROUND OF THE INVENTION

Fluid valves of the plug type are well known. The principal problem posed by such valves is the need to maintain a fluid seal between the rotating valve plug and the valve body. The valve plug is rotatable between an open position where fluid can pass freely through the valve to a closed position where the plug functions to block fluid flow. Failure to maintain a liquid seal will cause the fluid, often at high pressure, to leak around the plug to downstream piping. Further, whether the plug is at the open or closed position, the failure to provide for sealing of the plug can result in fluid leaking around the plug and venting through the plug stem to the environment. Such venting can present health, safety and fire hazards.

In view of the above problems, valves have been devised which include hydraulically actuated seals. For example, our co-pending U.S. application filed Sept. 15, 1982, Ser. No. 418,590, now U.S. Pat. No. 4,497,467, and titled "PLUG VALVE WITH HYDRAULICALLY ACTUATED SEALS", the subject matter which is incorporated by reference herein, discloses seals operated hydraulically to seal the plug within the body when the plug is at the closed position.

It has been found that in certain circumstances where the temperature of the fluid or the environment may vary or where the temperature is other than that for which the valve has been designed, expansion of the hydraulic fluid can create problems. Expansion of the fluid in a closed hydraulic system such as described in the patent application identified above, increases the hydraulic system pressure and, thereby, the pressure imposed upon the seals. One problem resulting from the increased pressure is that the valve may "freeze" in the closed position since the increased hydraulic pressure causes the seals to enagage the plug with such force to prevent rotation of the plug toward the open position. Even should the plug be freed for rotation, the increase in pressure may be such that the seals undesirably bind with the rotation of the plug. This tends to wear the seals and/or plug and possibly cause damage thereto. A still further problem is that the increased pressure may cause the hydraulic fluid to leak past sealing rings or the like eventually resulting in loss of hydraulic fluid and pressure.

SUMMARY OF THE INVENTION

There is, therefore, provided in the practice of the present invention, a valve of the rotating plug type having a body with an inlet duct and an outlet duct. A plug is rotatably disposed in the body and has a port to provide for fluid communication between the inlet and outlet ducts. The plug is movable between an open position wherein the port at least partially registers with both the inlet and outlet ducts to pass fluid through the valve to a closed position wherein no part of the port registers with the ducts, thereby preventing fluid from passing through the valve. Means are provided in the valve for forming a pressurizable seal between the body and plug, when the plug is at both the open and closed positions. To actuate the seal, a closed hydraulic system is provided. The hydraulic system includes a reservoir containing hydraulic fluid which is in communication with the seals. A pressure piston is movably disposed in the reservoir which, when moved by suitable displacement means, pressurizes the hydraulic fluid and the seal means to a selected pressure as determined by the stroke of the piston to effectuate a fluid seal between the plug and body. Rotation of a handle coupled to the plug may, by virtue of appropriate cam surfaces, advantageously be employed to displace the pressure piston.

The valve further includes a fluid chamber communicating with the reservoir and seal means. Disposed in the chamber to regulate the pressure of the hydraulic fluid and to provide a signal that the hydraulic system is pressurized, is a regulator piston. The regulator piston is resiliently urged against the hydraulic pressure by means such as Bellville springs with a force preselected in view of the pressure service of the valve. Displacement of the pressure piston to pressurize the hydraulic fluid and seal means also displaces the regulator piston against the resilient urging means to regulate the hydraulic fluid to the selected pressure. Movement of the regulator piston also can provide an indicator, visual or otherwise, that the system is under pressure.

Thermal expansion of the hydraulic fluid in the system from, for example, passing a high temperature fluid through the valve, displaces and bottoms the regulator piston against the urging means and thereafter results in an increase in the pressure of the hydraulic fluid. If the pressure increase is significant, the result could be damaged seals, leakage of the hydraulic fluid past the seals or the seals "freezing" the plug within the valve body to prevent rotation thereof.

To take into account or compensate for such fluid expansion, the valve includes compensating means which are adapted to maintain the pressure of the hydraulic fluid below a maximum pressure despite such thermal expansion. In one embodiment the compensating means includes biasing means which coact with the urging means. At normal or design temperatures the regulator piston moves against only the urging means to achieve the desired selected pressure of the hydraulic fluid. Should the hydraulic fluid expand, the compensating means are provided to permit further displacement of the regulator piston to prevent the hydraulic pressure from increasing above a maximum pressure at which it becomes subject to the negative effects noted above. In one embodiment, the compensating means include biasing means acting upon the regulator piston, the piston moving against the biasing means as a result of fluid expansion to maintain the hydraulic fluid pressure below the maximum pressure. In another embodiment, the pressure piston is movably positioned in a sleeve which is likewise movably disposed in the reservoir. Biasing means normally urge the sleeve to a first position. To pressurize the hydraulic fluid, the pressure piston is displaced relative to the sleeve. Such pressurization of the hydraulic fluid results in displacement of the regulator piston against the impetus of the urging means to regulate the hydraulic fluid pressure. In the event of thermal expansion of the hydraulic fluid, the sleeve is displaced within the reservoir against the biasing means increasing the hydraulic system volume to maintain the hydraulic fluid below the maximum pressure.

As can be appreciated, the plug valve according to the present invention advantageously includes means for sealing the plug in both the open and closed position and for compensating for thermal expansion of the hydraulic fluid of the plug sealing hydraulic system.

BRIEF DESCRIPTION OF THE DRAWINGS

These and other features and advantages of the present invention will become appreciated as the same becomes better understood with reference to the following description and drawings wherein:

FIG. 1 is a plan view of the plug valve according to the present invention;

FIG. 2 is a side, partial section view of the plug valve shown in the open position;

FIG. 3 is a partial end section view of the plug valve in the open position;

FIG. 7 is a partial section view of an alternative embodiment of the plug valve according to the present invention showing the location of the components when the hydraulic system is not pressurized;

FIG. 8 is a section view similar to FIG. 7 showing the position of the components when the hydraulic seals are pressurized; and FIG. 9 is a section view like FIG. 8 showing the position of the components when the hydraulic fluid thermally expands.

DETAILED DESCRIPTION

Figure 4:
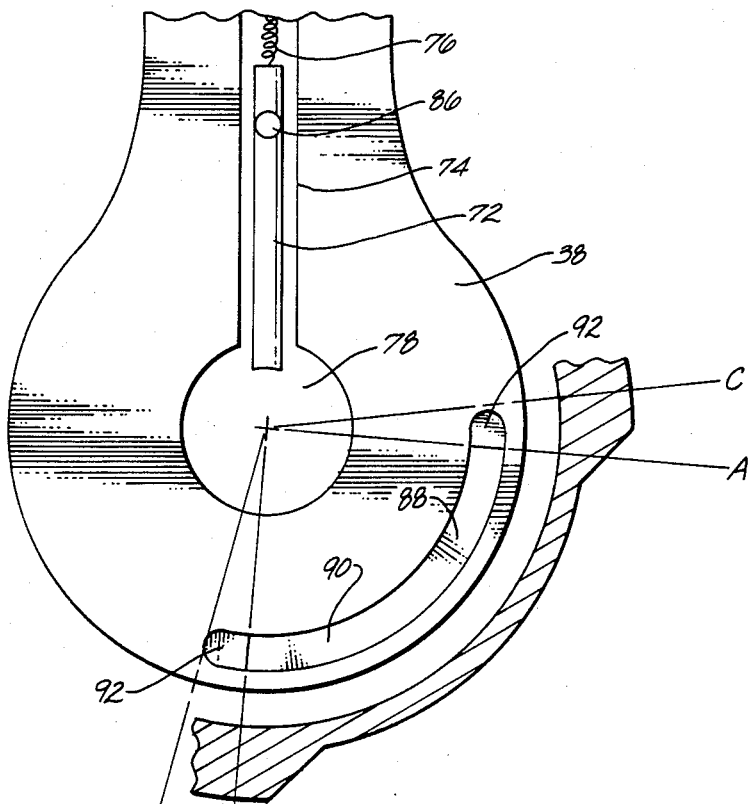
FIG. 4 is a plan view of a portion of the underside of the handle for the plug valve.

Turning to the drawings, FIGS. 1 and 2 show a plug valve 10 according to the present invention. The valve 10 includes a body 12 which may be fashioned from steel, cast iron or the like. The body 12 has at either end flanges 14 to connect the valve 10 to a fluid pipeline or equipment. To pass fluid the valve 10 includes inlet and outlet ducts 16 and 18 shown as being coaxially arranged.

To control the flow of fluid through the valve 10 and thereby the pipeline into which the valve is incorporated, the valve 10 further includes a cylindrical plug 20. The plug 20 is positioned for axial rotation within a cavity 22 formed within the body 12. As can be appreciated, the plug 20 is rotatable through 90° between an open position as shown in FIG. 2 wherein a diametrical plug bore 24 fully registers with both the inlet and outlet ducts 16 and 18 to freely pass fluid through the valve 10 to a closed position wherein no part of the plug bore 24 registers with the ducts, thereby preventing fluid from passing through the valve 10. It is this operation of the plug 20 that provides the desired flow control provided by the valve.

To provide for the aforesaid rotation of the plug 20 between the open and closed positions, the valve 10 further includes a stem 26 coupled to the plug 20 for mutual rotation. The stem 26 is received by a stem bore 28 extending from the cavity 22 to the exterior of the body. To seal the stem 26, the stem 26 includes an enlarged head 30 disposed within a cooperatively enlarged head bore 32. The head 30 includes a pair of spaced circumferential collars 34 adapted to trap O-rings 36 between the head 30 and the walls of the head bore 32 to seal the stem 26 within the stem bore 28. Between the collars 34 and O-rings 36 and the head bore 32 is a circumferential channel 37.

To provide for manual rotation of the stem and plug, the valve further includes a handle 38 kept about the stem 26 by a hex nut 40 threaded over the stem. As described below, the handle 38 is coupled for mutual rotation to the stem to rotate both the stem and plug between the open and closed positions shown as handle position A and B, respectively and is further provided with means for becoming uncoupled from the stem for relative movement thereto.

For high pressure service it is important to prevent the fluid from flowing around the plug to the stem bore 28 and to the exterior of the body 12. This leaking of fluid may occur when the plug is either in the closed or open position. When the plug is in the closed position, it is also important to prevent the high pressure fluid from leaking around the plug to the outlet duct 18 and to downstream piping. The failure to properly seal the plug can result in the release of harmful or flammable fluids to the environment or to downstream piping and equipment.

Accordingly, to seal the plug within the body, the valve 10 includes seal means. The seal means are adapted to form an annular seal between the plug and body around the inlet and outlet ducts. For this purpose, the plug includes, spaced around its circumference, four identical annular grooves 42, each adapted to retain a resilient, sealing O-ring 44. In the valve shown in the drawings the grooves 42 have centers spaced 90° from one another around the circumference of the plug. As can be seen in FIGS. 2 and 3 when the valve is in the open or the closed position, the grooves and O-rings are positioned to encircle the inlet and outlet ducts and plug bore.

To cooperate with the O-rings 44 to form a seal, the seal means also includes an annular chamber 46 surrounding and concentric with each of the inlet and outlet ducts 16 and 18. The annular chambers are positioned to register with the O-rings 44 when the plug is in the open and in the closed position. Movably disposed in each annular chamber 46 is a piston-like seal ring 48. Pressurization of fluid within the chamber 46 urges each seal ring 48 against the O-ring 44 and plug 20 to create a seal about each of the inlet and outlet ducts to prevent fluid from flowing around the plug.

To pressurize fluid in the annular chambers 46, the valve 10 includes a closed, fluid-filled hydraulic system. As shown in FIG. 2, the system has supply passages 50 which extend from the head bore channel 37 toward each of the flanges 14. From each of the supply passages 50, branch bores 52 extend to each of the annular chambers 46, thereby providing communication between the annular chambers 46 and the channel 37. Accordingly, pressurizing fluid within the channel 37 pressurizes the fluid within the supply passages and branch bores to urge the seal rings 48 to engage the plug 20 and O-rings 44 and create the desired seal.

Turning to FIG. 3, the hydraulic system also includes a cylinder-like reservoir 54. A pressure port 55 extends through the wall of the reservoir 54 to provide communication between the reservoir and channel 37. A threaded cap 57 defines the upper closure for the reservoir. Closely received by the reservoir 54 is a pressure piston 56 having a piston head 58 and a rod 60. The piston head 58 includes a pair of spaced circumferential grooves adapted to hold O-rings 62, thereby slidably sealing the piston head 58 within the chamber 54.

The piston head traps a volume of hydraulic fluid within the reservoir such that displacement of the pressure piston 56 reduces such volume pressurizing the entire hydraulic system. Viewing FIG. 3, the pressure piston is shown in a raised first position wherein the system is unpressurized or at a relatively low pressure. Urging the pressure piston downward into the reservoir 54 (FIG. 4) pressurizes the hydraulic fluid within the reservoir, that pressure communicated to the channel 37 via the pressure port 55. Similarly, that pressure is communicated by the fluid through the supply passages and branch bores to the annular chambers 46. The end result is the urging of the seal rings 48 against the plug 20 and O-rings 44.

From time to time it may be necessary to provide access to the plug, its O-rings, and to the seal rings 48. Heretofore, access has been had by disassembling the handle, stem and related structure and pulling the plug from the body in a direction upward as shown in FIG. 2. As can be appreciated, this method of accessing a plug necessarily results in the loss of the hydraulic fluid within the hydraulic system. Upon reassembly the hydraulic system must be refilled with fluid and bled, which is both time consuming and messy.

To avoid disturbing the hydraulic system, the plug valve according to the present invention includes an access plate 66 secured to the body 12 opposite the plug stem 26. The plate 66 provides a rotatable bearing surface for the plug and is secured to the body 12 by bolts 68 or the like. A seal ring 70 is positioned between the plate 66 and the body 12 to prevent fluid passing through the valve from escaping from the valve.

As stated above, the valve plug 20 is movable via the handle between an open position (FIG. 2) and a closed position shown as handle positions A and B, respectively. It has been found that when the valve is used in high pressure service and is in the open position, the fluid may tend to escape around the plug and into the head bore to either invade the hydraulic system or to escape from the valve 10 through the stem bore 28. When in the closed position, the high pressure fluid in addition to escaping from the valve as discussed above, may leak around the plug to the outlet duct and to downstream piping. As can be appreciated, the leaking of the fluid around the plug can create a health, safety or fire hazard by escaping to the atmosphere or to downstream piping which may be opened for maintenance.

To rotate the plug and pressurize the hydraulic system, the handle 38 is provided. When the handle is in position A (FIG. 1) the plug is in the open position. To rotate the plug to the closed position the handle 38, being coupled to the plug stem, is manually rotated to position B, whereat the plug has been rotated 90° to the closed position. Accordingly, during rotation of the plug between positions A and B the handle 38 is coupled to the stem.

To pressurize the hydraulic system and activate the seal means at both the open and closed positions by displacing the pressure piston rod, means are provided for uncoupling the handle from the stem so that the handle can move relative to the stem and provide a motive force for displacing the piston.

To provide for the aforementioned uncoupling of the handle from the stem and for displacing the pressure piston rod, the handle includes a locking pin 72 slidably positioned in a slot 74. A spring 76 normally urges the pin to extend into a handle orifice 78 which receives and surrounds the valve stem. Between the open and closed positions A and B the locking pin is received by a notch (not shown) in the stem thereby coupling the handle with the stem and plug for mutual rotation between positions A and B.

As the handle achieves either of the open or closed positions A or B, means are provided for uncoupling the handle 38 from the stem to enable the handle to be rotated relative to the stem approximately about 10 degrees to either of the overtravel positions C or D, as shown in FIG. 1. This overtravel rotation of the handle 38 provides, as described below, for displacement of the pressure piston and pressurization of the hydraulic system. To uncouple the handle 38 from the stem an arcurate track 80 is disposed on the valve body 12 just beneath the handle 38. The track 80 has outwardly projecting ridges 82 adjacent to positions A and B as best shown in FIG. 1. At the ends of the track 80 circular pockets 84 are provided and are substantially aligned with the overtravel positions C and D.

The locking pin 72 has a tab 86 depending therefrom and positioned in the track 80. During rotation of the handle between positions A and B the tab 86 follows the track 80 without resulting in the outward displacement of the locking pin 76. As the handle 38 is rotated and approaches either of the positions A or B, the ridge 82 urges the tab 86 in a direction outwardly from the plug stem against the bias of the spring to withdraw the pin from the notch for uncoupling of the handle from the stem. As the handle reaches either of the positions A or B, the locking pin is fully withdrawn from the notch to free the handle to continue to move to either of the adjacent overtravel positions C or D. At either of the overtravel positions C or D the tab engages the margin of the pocket to prevent further rotation of the handle.

To again couple the handle to the stem, the handle is reversely rotated toward either of the adjacent positions A or B. The spring urges the tab to follow the ridge and thereby the insertion of the locking pin back into the notch of the stem. Thereafter the handle becomes coupled to the stem for rotation between positions A and B.

To pressurize the hydraulic system the handle includes a semicircular cam surface 88 at its underside arranged to lie adjacent the pressure piston rod. As shown in FIG. 4, the cam surface 88 has a travel portion 90 between positions A and B, that travel portion 90 being fashioned so as not to displace the rod and pressurize the hydraulic system. Accordingly, as the plug is rotated between the open and closed and positions A and B the hydraulic system is not pressurized and the seal ring does not bind the rotation of the valve plug. Between either of the open and closed positions A and B to the adjacent overtravel positions C or D, the cam surface 88 further includes a pressurizing portion 92 adapted, upon rotation of the handle to the overtravel position, to displace the piston rod downwardly and pressurize the hydraulic system. As the handle is returned from the overtravel position to the adjacent position A or B the hydraulic pressure urges the piston and its rod to follow the contour of the cam surface 88 and deactivate the seal means.

As can be appreciated, it follows from the above that the rotation of the handle 38 not only provides for the rotation of the plug between the open and closed positions but also, by virtue of the handle becoming uncoupled from the stem, provides for the pressurization of the hydraulic system.

Based upon the service for which the valve 10 is intended, means are provided for regulating the state of pressurization of the hydraulic system to a selected pressure. For this purpose, the valve 10 further includes a regulator piston 94 coaxially arranged within the plug stem 26 as shown in FIGS. 3, 5 and 6–9. The regulator piston 94 is received into an axial bore 96 having an upper cylindrical cavity 100 and a reduced diameter, coaxial cylinder portion 102. The cylinder portion 102 communicates with the channel 37 and thereby the hydraulic system via radial ports 104.

The regulator piston has a rod 106 extending upwardly from an enlarged head 108. The head 108 is closely received into the cylinder portion and includes a pair of circumferential grooves 110 to receive sealing O-rings which slidably seal the regulator piston head within the cylinder portion. To slidably guide the regulator piston shaft and provide closure means for the cylindrical cavity, a cap 112 is threadably received into the cavity, the cap including an axial bore to slidably pass the regulator piston rod.

Figure 5:
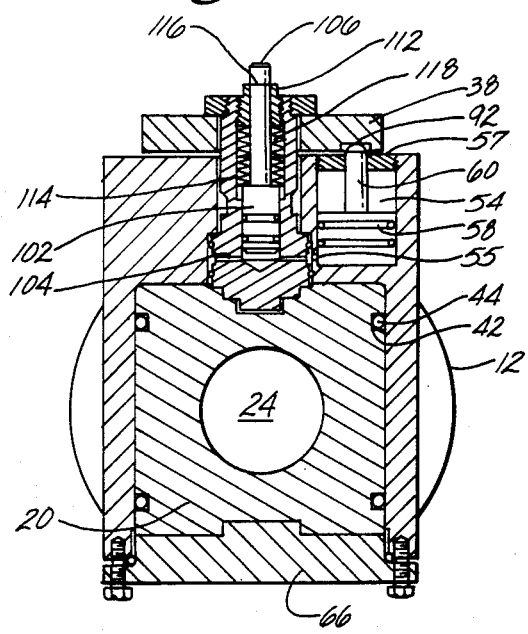
FIG. 5 is an end section view like that of FIG. 4, showing the position of the pressure and regulator pistons to pressurize the seals.

Viewing FIGS. 3 and 5, to regulate the hydraulic system pressure and thereby the force of the seal means between the valve body and plug, means are provided to normally urge the regulator piston 94 against the hydraulic fluid present in the system. Preferably, these means are embodied as a plurality of Bellville springs 114 located between the regulator piston head 108 and the threaded cap 112. As shown in FIG. 3, when the hydraulic system is not pressurized, i.e., when the handle is located between positions A and B, the biasing means urge the regulator piston head to bottom within the cylinder portion. When the handle 38 is uncoupled from the stem and is rotated to either of the overtravel positions C or D, the cam surface 88, as described above, displaces the pressure piston 56 to pressurize the hydraulic system. The pressurization of the hydraulic system, via the ports 104 urges the regulator piston upwardly as shown in FIG. 5 against the bias of the Bellville springs 114. By selecting the resiliency of the biasing means embodied by the Bellville springs, the pressure of the hydraulic system and thereby the sealing force of the seal means can be adjusted. As shown in FIG. 5, the pressurization of the hydraulic system urges the regulator piston rod to extend above the plug, giving a visual indication that the system is under pressure. Index means such as a circumferential mark 116 about the regulator piston rod indicate that the system is at the selected pressure as determined by the resiliency of the urging means and the stroke of the regulator piston. By adjusting the plug within the chamber with a wrench or the like to align the index mark with the top of the cap, an operator can correct the actual hydraulic system pressure to the selected pressure.

During operation of the valve 10 temperature changes may be imposed upon the fluid of the hydraulic system. These temperature changes may be as a result of changing ambient conditions, temperature changes of the fluid passing through the valve or a combination of both. Heretofore, these temperature changes have been ignored and thought to be inconsequential. However, it has been found that if the temperature change is significant, the expansion of the hydraulic fluid can increase the hydraulic system pressure such that the urging means bottoms, i.e., is fully compressed, with the pressure increasing further causing the seal force to achieve unexpected magnitudes. For example, it has been found that at the overtravel positions C and D, the increase in the hydraulic system pressure may be to such levels as to urge the hydraulic fluid past the O-ring seals in the system until an equalibrium is reached. This loss of hydraulic fluid can damage the seals and undermine the ability of the seal means to function properly. Furthermore, the expansion of the hydraulic fluid in the hydraulic system may be so significant as to, between positions A and B, bottom the biasing means and pressurize the hydraulic system and seal means to such an extent that the plug becomes frozen within the valve and connot be rotated or if it can be rotated, may cause increased wear between the seal ring and the plug during rotation.

Figure 6:
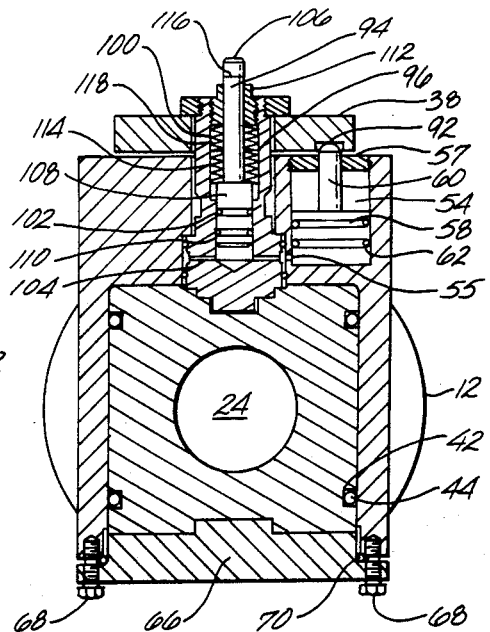
FIG. 6 is an end section view like FIG. 5 illustrating the position of the regulator piston when the hydraulic fluid thermally expands.

To overcome the drawbacks noted above, the valve 10 further includes means for compensating for thermal expansion of the fluid of the hydraulic system. These compensating means as shown in FIGS. 3, 5 and 6 may be embodied as a second set of Bellville springs 118 having a higher spring rate than those of the urging means. As shown, the Bellville springs 118 are stacked between the Belleville springs 114 and the cap.

During normal, operation of the valve at the selected hydraulic system pressure, the second set of springs 118 are inactive, the Bellville springs 114 of the urging means compressing to regulate the pressure of the hydraulic system. Should a thermal change occur, the pressure of the hydraulic system will increase, compressing the Bellville springs 114 and thereafter beginning to compress the second set of springs, as shown in FIG. 6. The compression of the second set of springs caused by the further displacement of the regulator piston maintains the hydraulic system pressure below a maximum pressure, thereby protecting the seal means from damage. As shown in FIG. 6, the thermal expansion of the fluid of the hydraulic system causes the index mark to be located above the adjustable cap. An operator inspecting the valve and seeing the location of the index mark above the cap need only adjust the position of the cap until its upper surface again aligns with the mark to compensate for the compression of the second set of springs and thereby the system hydraulic pressure, returning the pressure to its selected and desired state. Accordingly, the second set of springs provides an immediate check upon the hydraulic system pressure until such time as an operator can adjust the cap to return the hydraulic system pressure to its design level.

Turning to FIGS. 7–9, alternative means for compensating for thermal expansion of the hydraulic fluid are shown. In this embodiment the reservoir includes a sleeve 120 slidably received into and keyed by suitable means within the reservoir and having a closed bottom. The sleeve is suitably sealed by O-rings 122. Within the sleeve is slidably positioned the pressure piston head, the piston rod extending through an aperture at the bottom of the sleeve. Accordingly, the pressure piston and sleeve are disposed within the reservoir for relative movement. The regulator piston 94 is biased by the springs 114.

To compensate for thermal expansion of the hydraulic fluid, compensating means are provided and include Bellville springs 118 positioned in the reservoir between the bottom of the sleeve and the reservoir cap 57, as shown in FIG. 7.

To pressurize the hydraulic system and the seal means, the handle is rotated to an overtravel position whereupon the piston is urged downwardly into the reservoir, pressurizing the hydraulic fluid. The movement of the hydraulic piston displaces the sleeve slightly until the pressure port 55 is uncovered whereupon the hydraulic fluid enters the circumferential channel and the remainder of the hydraulic system. The pressurization of the hydraulic fluid displaces the regulator piston against the bias of the springs 114 which, as described above, regulate the hydraulic system fluid pressure and thereby the seal force of the seal ring against the plug.

In the event of thermal expansion of the hydraulic fluid at, for example, the closed position as shown in FIG. 9, that expansion of the hydraulic fluid would fully compress the Bellville springs 114 positioning the index mark on the regulator piston rod above the closure plug. Increased fluid pressure displaces the sleeve against the bias of the springs 118 increasing the overall volume of the hydraulic system. As shown, the sleeve remains sealably disposed about the piston to prevent the hydraulic fluid from escaping from the reservoir through the sleeve and cap 57. An operator observing the location of the index mark above the closure cap would thereupon adjust the position of the closure cap to realign its top with the index mark, increasing the system volume to such an extent that the hydraulic pressure is returned to its selected and desired level. Necessarily, the compensating means embodied as the springs, would, upon adjustment of the closure plug, urge the sleeve to its position as shown in FIG. 8.

While we have shown and described certain embodiments of the present invention, it is to be understood that it is subject to many modifications without departing from the spirit and scope of the invention as set forth in the attached claims.

What is claimed is:

1. A valve of the type having a body with an inlet and outlet duct, a plug rotatably disposed in the body and having a port for fluid communication between the ducts, such port at least partially registering with the ducts when the valve is at an open position and not registering with the ducts when the valve is at a closed position, pressurizable means for forming a seal between the body and plug, a closed fluid-filled hydraulic system including a reservoir containing a hydraulic fluid in communication with the seals and a pressure piston movably disposed in the reservoir and means for displacing the piston to apply a selected pressure to the hydraulic fluid for pressuring the seal means, the improvement comprising:

the valve includes a bore communicating with the reservoir and seals;

a regulator piston movably disposed in the bore;

means for resiliently urging the regulator piston against the hydraulic pressure in the reservoir with a preselected force, displacement of the pressure piston to pressurize the seal means displacing the regulator piston against the urging means to regulate the pressure of the hydraulic fluid; and means for compensating for thermal expansion including a sleeve movably disposed in the reservoir, the sleeve movably mounting the pressure piston, the compensating means including means for biasing the sleeve against the hydraulic fluid with a force greater than the selected hydraulic fluid pressure, thermal expansion of the fluid displacing the sleeve against the biasing means to increase the volume of the hydraulic system to prevent over-pressurization of the hydraulic system.

2. A valve of the type having a body with an inlet and outlet duct, a plug rotatably disposed in the body and having a port for fluid communication between the ducts, such port at least partially registering with the ducts when the valve is at an open position and not registering with the ducts when the valve is at a closed position, pressurizable means for forming a seal between the body and plug, a closed fluid-filled hydraulic system including a reservoir containing a hydraulic fluid in communication with the seals and a pressure piston movably disposed in the reservoir and means for displacing the piston to apply a selected pressure to the hydraulic fluid for pressurizing the seal means, the improvement comprising:

the valve including a bore communicating with the reservoir and seals;

a regulator piston movably disposed in the bore;

means for resiliently urging the regulator piston against the hydraulic pressure in the reservoir with a preselected force, displacement of the pressure piston to pressurize the seal means displacing the regulator piston against the urging means to regulate the pressure of the hydraulic fluid to the selected pressure; and means for compensating for thermal expansion of the hydraulic fluid including a sleeve sealably and movably disposed in the reservoir, the pressure piston movably disposed within the sleeve for pressurization of the hydraulic fluid and means for biasing the sleeve against the hydraulic fluid with a force preventing displacement of the sleeve relative to the pressure piston at the selected pressure, thermal expansion of the hydraulic fluid increasing the pressure of the hydraulic fluid and displacing the sleeve against the biasing means relative to the pressure piston to increase the volume of the hydraulic system and prevent over-pressurization of the seal means.

3. A valve of the type having a body with an inlet and outlet duct, a plug rotatably disposed in the body and having a port for fluid communication between the ducts, such port at least partially registering with the ducts when the valve is at an open position and not registering with the ducts when the valve is at a closed position, pressurizable means for forming a seal between the body and plug, a closed fluid-filled hydraulic system including a reservoir containing a hydraulic fluid in communication with the seals and and a pressure piston movably disposed in the reservoir and means for displacing the piston to apply a selected pressure to the hydraulic fluid for pressurizing the seal means, the improvement comprising:

the valve includes a bore communicating with the reservoir and seals;

a regulator piston movably disposed in the bore;

means for resiliently urging the regulator piston against the hydraulic pressure in the reservoir with a preselected force, displacement of the pressure piston to pressurize the seal means displacing the regulator piston against the urging means to regulate the pressure of the hydraulic fluid;

means for compensating for thermal expansion of the hydraulic fluid in the system to prevent over-pressurization of the seal means; and the means for displacing the piston including a handle coupled to the plug for mutual rotation between the open and closed positions, means for uncoupling the handle from the plug for relative movement at each of the open and closed positions to an adjacent overtravel position and a cam surface on the handle contained to displace the pressure piston upon rotation of the handle to the adjacent overtravel position to pressurize the hydraulic fluid and the seal means at each of the open and closed positions, the uncoupling means including a locking pin movable from an extended position to couple the handle to the plug to a retracted position to free the handle for relative movement and a track disposed on the valve body, said locking pin engaged with the track, the track urging the locking pin to retract at each of the open and closed positions.

* * * * *